(12) United States Patent
Larose, Jr. et al.

(10) Patent No.: US 9,133,747 B2
(45) Date of Patent: Sep. 15, 2015

(54) SELECTIVE CATALYST REDUCTION FILTER WASHCOAT THICKNESS AMMONIA COMPENSATION SYSTEM

(71) Applicant: GM Global Technology Operations LLC, Detroit, MI (US)

(72) Inventors: Thomas Larose, Jr., Howell, MI (US); Christopher C. Swoish, Lapeer, MI (US); Christopher Whitt, Howell, MI (US); Justin Adam Shetney, Livonia, MI (US)

(73) Assignee: GM Global Technoogy Operations LLC, Detroit, MI (US)

( * ) Notice: Subject to any disclaimer, the term of this patent is extended or adjusted under 35 U.S.C. 154(b) by 0 days.

(21) Appl. No.: 14/066,861

(22) Filed: Oct. 30, 2013

(65) Prior Publication Data

US 2015/0113951 A1    Apr. 30, 2015

(51) Int. Cl.
*F01N 3/00* (2006.01)
*F01N 3/18* (2006.01)

(52) U.S. Cl.
CPC .................................. *F01N 3/18* (2013.01)

(58) Field of Classification Search
USPC ............ 60/274, 286, 295, 297, 301, 303, 311
See application file for complete search history.

(56) References Cited

U.S. PATENT DOCUMENTS

| | | | |
|---|---|---|---|
| 7,673,448 B2 * | 3/2010 | Voss et al. ........................ | 60/297 |
| 8,074,443 B2 * | 12/2011 | Dalla Betta et al. ............ | 60/286 |
| 8,240,194 B2 * | 8/2012 | Dobson et al. ............. | 73/114.75 |
| 8,409,515 B2 * | 4/2013 | Ren et al. ....................... | 422/171 |
| 8,516,798 B2 * | 8/2013 | Dobson et al. .................. | 60/286 |
| 8,667,785 B2 * | 3/2014 | Blakeman et al. .............. | 60/299 |

* cited by examiner

*Primary Examiner* — Binh Q Tran
(74) *Attorney, Agent, or Firm* — Cantor Colburn LLP

(57) ABSTRACT

An exhaust treatment system includes a selective catalyst reduction filter (SCRF) device, a reductant delivery system, and a reductant storage module. The SCRF device includes a filter portion having a washcoat disposed thereon that defines a washcoat thickness (WCT). The reductant delivery system is configured to inject a reductant that reacts with the washcoat. The reductant storage module is in electrical communication with the reductant delivery system to determine a reductant setpoint that controls the amount of reductant injected from the reductant delivery system. The exhaust treatment system further includes a WCT compensation module configured to electrically communicate a WCT compensation value to the reductant storage module. The reductant storage module adjusts the setpoint according to the WCT compensation value such that the amount of ammonia that slips from the SCRF device is reduced as compared to the first setpoint.

14 Claims, 2 Drawing Sheets

SELECTIVE CATALYST REDUCTION FILTER WASHCOAT THICKNESS AMMONIA COMPENSATION SYSTEM

CROSS-REFERENCE TO RELATED APPLICATION(S)

Reference is made to U.S. application Ser. No. 14/066,877, entitled "SCR FILTER WASHCOAT THICKNESS EFFICIENCY COMPENSATION SYSTEM", which is filed on even date herewith, is assigned to same assignee as this application, and which the entire disclosure of the above-referenced application hereby being incorporated by reference in its entirety.

FIELD OF THE INVENTION

The subject invention relates to exhaust treatment systems, and more specifically, to a selective catalyst reduction and a reductant delivery system.

BACKGROUND

Exhaust gas emitted from an internal combustion (IC) engine, is a heterogeneous mixture that may contain gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Exhaust gas treatment systems typically include selective catalytic reductant (SCR) devices. The SCR device includes a substrate having a washcoat disposed thereon to reduce the amount of NOx in the exhaust gas. The typical exhaust treatment system also includes a reductant delivery system that injects a reductant such as, for example, ammonia ($NH_3$), urea ($CO(NH2)2$, etc.). The SCR device makes use of $NH_3$ to reduce the NOx. For example, when the proper amount of $NH_3$ is supplied to the SCR device under the proper conditions, the $NH_3$ reacts with the NOx in the presence of SCR catalyst to reduce the NOx emissions. However, if the reduction reaction rate is too slow, or if there is excess ammonia in the exhaust, ammonia can slip from the SCR and be emitted to the environment.

SUMMARY OF THE INVENTION

In one exemplary embodiment of the disclosure, an exhaust treatment system includes a selective catalyst reduction filter (SCRF) device, a reductant delivery system, and a reductant storage module. The SCRF device includes a filter portion having a catalyst containing washcoat disposed thereon that defines a washcoat thickness (WCT). The reductant delivery system is configured to inject a reductant that reacts with the catalyst containing washcoat. The reductant storage module is in electrical communication with the reductant delivery system to determine a reductant setpoint that controls the amount of reductant injected from the reductant delivery system. The exhaust treatment system further includes a WCT compensation module configured to electrically communicate a WCT compensation value to the reductant storage module. The reductant storage module adjusts the reductant setpoint according to the WCT compensation value such that the amount of reductant that slips from the SCRF device is reduced as compared to the initial setpoint.

In another exemplary embodiment of the disclosure, a method of controlling an exhaust treatment system comprises determining a setpoint corresponding to a reductant delivery model that controls an amount of reductant injected from a reductant delivery system. The method further includes determining a thickness of a catalyst containing washcoat (WCT) disposed on a selective catalyst reduction filter (SCRF) device included in the exhaust treatment system. The method further includes comparing the WCT to a nominal WCT value stored in a memory device. The method further includes adjusting the reductant setpoint according to the WCT compensation value to generate a new setpoint that minimizes an amount of reductant that slips from the SCRF device, and injecting reductant from a reductant delivery system based on the new setpoint.

In yet another exemplary embodiment of the disclosure, a control module is configured to inject an amount of reductant that reacts with a catalyst containing washcoat disposed on a selective catalyst reduction filter (SCRF) device. The control module includes a reductant control module, and a reduction storage module. The reductant control module is configured to inject the reductant according to an initial setpoint that indicates a target storage level of the SCRF device. The reduction storage module is configured to determine the initial setpoint based on a reductant storage model stored in a memory device. The control module further includes a washcoat thickness (WCT) compensation module. The WCT compensation module is configured to compare a thickness of the washcoat with a nominal washcoat thickness value stored in the memory device, and to generate a WCT compensation value based on the comparison. The reductant storage module is in electrical communication with the WCT compensation module and adjusts the current setpoint based on the WCT compensation value to generate a new setpoint, which is different than the initial setpoint The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
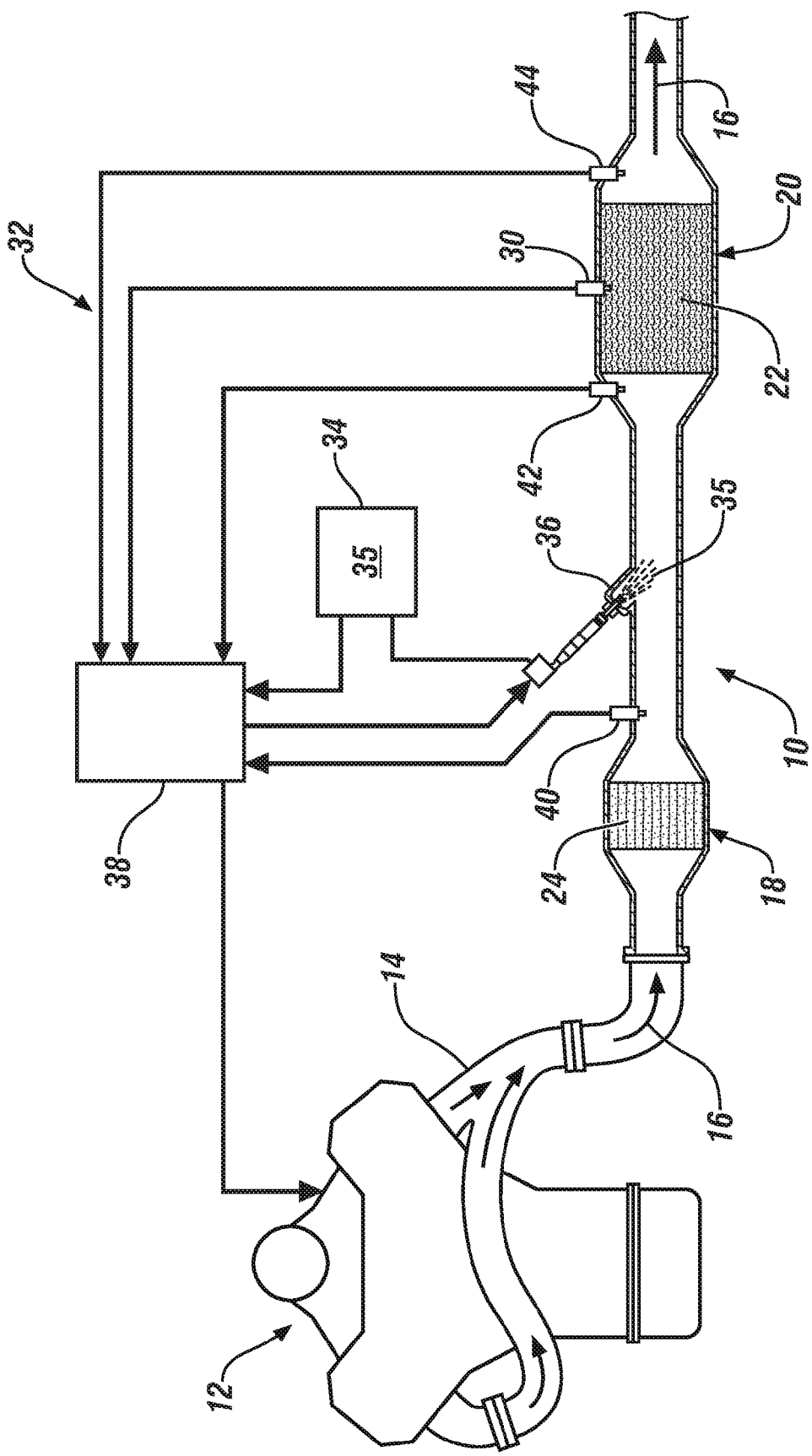
FIG. 1 is a schematic diagram of an exhaust gas treatment system including a reductant delivery system in accordance with exemplary embodiments.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, but are not limited to, an oxidation catalyst device ("OC") 18, and a selective catalytic reduction filter (SCRF) 20.

In FIG. 1, the exhaust gas conduit 14, which may comprise several segments, transports exhaust gas 16 from the engine 12 to the various exhaust treatment devices 18, 20 of the exhaust gas treatment system 10. As can be appreciated, the OC 18 can be of various flow-through, oxidation catalyst devices known in the art. In various embodiments the OC 18 may include a flow-through metal or ceramic monolith substrate 24 that is wrapped in an intumescent matte or other suitable support that expands when heated, securing and insulating the substrate. The substrate 24 may be packaged in a stainless steel shell or canister having an inlet and an outlet in fluid communication with the exhaust gas conduit 14. The substrate 24 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCRF 20 may be disposed downstream from the OC 18. The SCRF 20 includes a filter portion 22 that is configured to remove carbon and other particulate matter from the exhaust gas 16. In at least one exemplary embodiment, the filter portion 22 is formed as a particulate filter (PF), such as a diesel particulate filter (DPF). The filter portion (i.e., the PF) may be constructed, for example, using a ceramic wall flow monolith exhaust gas filter substrate that is wrapped in an intumescent or non-intumescent matte (not shown). When heated, the filter substrate may expand to secure and insulate the filter substrate which is packaged in a rigid, heat resistant shell or canister. The filter portion 22 has an inlet and an outlet in fluid communication with exhaust gas conduit 14 and may trap particulate matter as the exhaust gas 16 flows therethrough. It is appreciated that a ceramic wall flow monolith filter substrate is merely exemplary in nature and that the filter portion 22 may include other filter devices such as wound or packed fiber filters, open cell foams, sintered metal fibers, etc. The exhaust treatment system 10 may also perform a regeneration process that regenerates the filter portion 22 by burning off the particulate matter trapped in the filter substrate, as known to those ordinarily skilled in the art.

The catalyst containing washcoat disposed on the filter portion 22 is configured to reduce NOx constituents in the exhaust gas 16. The SCRF 20 may utilize a reductant, such as ammonia ($NH_3$), to reduce the NOx as understood by those ordinarily skilled in the art. The catalyst containing washcoat may contain a zeolite and one or more base metal components such as iron (Fe), cobalt (Co), copper (Cu), or vanadium which can operate efficiently to convert NOx constituents of the exhaust gas 16 in the presence of $NH_3$. The reductant utilized by the SCRF 20 may be in the form of a solid, a gas, a liquid, or an aqueous urea solution and may be mixed with air to aid in the dispersion of an injected spray generated by a reductant delivery system, as discussed in greater detail below.

The exhaust gas treatment system 10 may further include at least one pressure sensor 30 (e.g., a delta pressure sensor), as illustrated in FIG. 1. The delta pressure sensor 30 may determine the pressure differential (i.e., $\Delta p$) across the SCRF 20. Although a single delta pressure sensor 30 is illustrated, it is appreciated that a plurality of pressure sensors may be used to determine the pressure differential of the SCRF 20. For example, a first pressure sensor may be disposed at the inlet of the SCRF 20 and a second pressure sensor may be disposed at the outlet of the SCRF 20. Accordingly, the difference between the pressure detected by the second delta pressure sensor and the pressure detected by the first delta pressure sensor may indicate the pressure differential of the SCRF 20.

The exhaust treatment system 10 illustrated in FIG. 1 further includes a reductant delivery system 32 that introduces a reductant to the exhaust gas 16. The reductant delivery system 32 includes a reductant supply 34, an injector 36, and a control module 38. The reductant supply 34 stores a reductant 35 and is in fluid communication with the injector 36. The reductant 35 may include, but is not limited to, $NH_3$. Accordingly, the injector 36 may inject a selectable amount of reductant 35 into the exhaust gas conduit 14 such that the reductant 35 is introduced to the exhaust gas 16 at a location upstream of the SCRF 20.

The control module 38 may control the engine 12, the reductant delivery system 32 and the regeneration process based on sensed data provided by the sensor and/or modeled data stored in memory. In various embodiments, the control module 38 further diagnoses one or more sub-systems and/or devices of the exhaust treatment system 10 based on one or more sensed and/or modeled inputs based on the diagnostic methods and systems of the present disclosure. In one example, the control module 38 is in electrical communication with a plurality of temperatures sensors 40-44. A first temperature sensor 40 is disposed at the outlet of the OC 18, a second temperature sensor 42 is disposed upstream from the SCRF 20 and a third temperature sensor 44 is disposed downstream from the SCRF 20.

The first temperature sensor 40 senses a temperature of the exhaust gas 16 at the outlet of the OC 18, and generates a temperature signal based thereon. The second temperature sensor 42 senses a temperature of exhaust gas 16 at the inlet of the SCRF 20 and generates a second temperature signal based thereon. The third temperature sensor 44 senses a temperature of exhaust gas 16 at the outlet of the SCRF 20 and generates a third temperature signal based thereon. Although the exemplary embodiment illustrated in FIG. 1 describes three sensors, it is appreciated that less or more sensors may be included. In addition, the invention is not limited to the sensor locations described above.

The control module 38 may determine an absolute temperature of the SCRF 20 (i.e., the SCRF temperature). The SCRF temperature may be determined according to various, measurements, algorithms and/or models known to those of ordinary skill in the art. The temperature gradient, on the other hand, is the rate of change of the SCRF temperature. That is, the SCRF temperature gradient is the change in SCRF temperature over time. The SCRF temperature may be measured in units of kelvins (K) per second (s), (i.e., K/s).

Generally speaking, the control module 38 receives one or more temperature signals from one or more of the temperatures sensors 40, 42, 44. The control module 38 may also determine one or more temperatures of the exhaust treatment system 10 using one or more temperature models as understood by those ordinarily skilled in the art. The temperatures sensors 40, 42, 44, and/or the temperature models may generate one or more temperature signals indicating a determined temperature of a respective component and/or thermal area. For example the temperature sensors 40, 42, 44 and/or a temperature model may output a temperature signal indicating an SCRF temperature of the SCRF 20.

The control module 38 controls operation of the injector 36 according to a reductant storage model. The reductant storage module may be utilized to determine an amount of reductant 35 to be stored on the SCRF 20 as understood by those ordinarily skilled in the art. The control module 38 may determine a correction coefficient corresponding to the reductant storage model based on the temperature gradient of the SCRF 20, and may more precisely control the amount of injected reductant provided by the injector 36, as described in greater detail below. Accordingly, the supply of reductant 35 may be utilized more efficiently.

Figure 2:
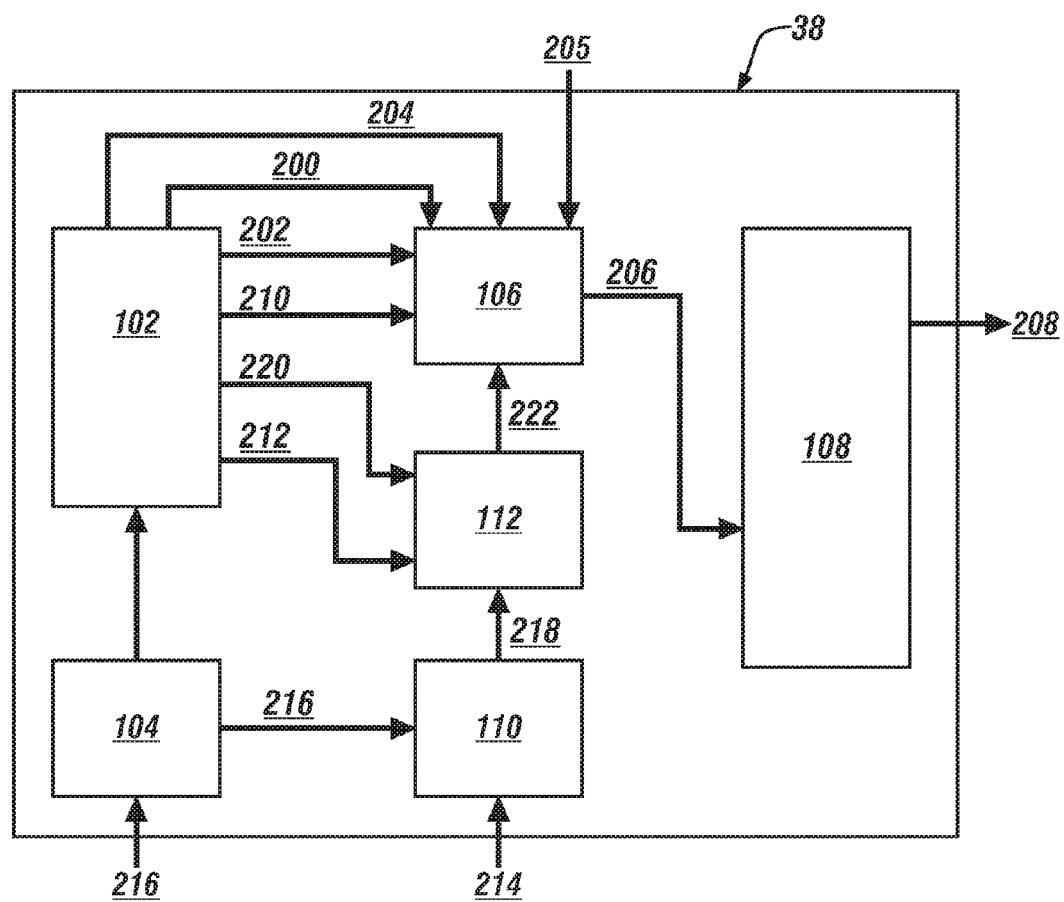
FIG. 2 is a block diagram illustrating a control module configured to determine a washcoat compensation value according to an exemplary embodiment of the disclosure.

Turning now to FIG. 2, a block diagram illustrates a control module 38 that determines a washcoat thickness (WCT) compensation value. The control module 38 may then apply a WCT compensation value to the reductant storage model to generate an updated storage setpoint, which is calibrated with respect to the WCT of the SCRF 20. Various embodiments of the exhaust gas treatment system 10 of FIG. 1 according to the present disclosure may include any number of sub-modules embedded within the control module. As can be appreciated, the sub-modules shown in FIG. 2 may be combined or further partitioned as well. Inputs to the control module 38 may be sensed from the exhaust gas treatment system 10, received from other control modules, or determined by other sub-modules.

The control module 38 according to at least one embodiment illustrated in FIG. 2 includes a memory 102, an entry condition module 104, a reductant storage module 106, an injector control module 108, a WCT module 110, and a WCT compensation module 112. Each of the modules 104-112 interfaces and electrically communicates with the memory 102 to retrieve and update stored values as needed.

In one embodiment, the memory 102 of the control module 38 stores one or more threshold values, time periods over which the temperatures were measured, a number of configurable limits, maps, data values, variables, temperature models, and system models used to control the reductant delivery system 32. In at least one exemplary embodiment, the memory 102 stores the reductant storage model, which may be utilized to determine an amount of reductant 35 to be stored on the SCRF 20 as described in detail above. The reductant storage model utilizes various operating parameters provided by at least one model and/or vehicle sensors to determine the stored reductant 35 including, but not limited to, exhaust flow rate, and reduction injection rate.

The memory 102 may also store one or more temperature thresholds and/or temperature threshold ranges corresponding to a respective soot combustion temperature. In addition, the memory 102 may store one or more SCRF temperature models for determining the SCRF temperature. In at least one embodiment, f the SCRF temperature, is modeled according to temperature signals generated by one or more of the temperature sensors 40, 42, 44, and one or more temperature models stored in the memory 102.

The reductant storage module 106 receives one or more engine operating signals 202, including temperature signals indicating the SCRF temperature. The temperature signals may be provided by one or more of the temperatures sensors 40-44 and/or one or more temperature models stored in the memory 102. The reductant storage module 106 determines a reductant storage setpoint based on the reductant storage model, and the SCRF temperature. The reductant storage model may be stored in the memory 102 and output via signal 200 to the reductant storage module 106 when needed.

In at least one embodiment, the reductant storage model 200 may be used to estimate the amount of reductant (e.g., the mass of reductant) stored on the SCRF 20. The reductant storage model 200 may define one or more exemplary actual reductant storage trajectories (i.e., modeled curves). A reductant storage trajectory may indicate an operating condition associated with a rapid change in the inlet temperature of the SCRF 20, coupled with a low engine NOx generation rate 204, which may occur during an engine acceleration event for example. The NOx generation rate may be determined by a NOx model stored in the memory 102 and/or one or more sensors, such as a NOx sensor as is known to those ordinarily skilled in the art.

The exemplary actual reductant storage trajectory corresponds to a present $NO_x$ generation rate generated by the engine 12, the SCRF temperature, and the exhaust mass flow rate. For example, the reductant storage module 106 may receive one or more engine operating signals 202 indicating the $NO_x$ rate and the SCRF temperature from one or more sensors and/or models as discussed in detail above. The exhaust mass flow rate is based on the intake air mass ($m_{AIR}$) of the engine 12 and the fuel mass flow ($m_{FUEL}$) of the engine 12. An intake air mass airflow sensor may output a $m_{AIR}$ signal 205 indicating the $m_{AIR}$ as known by those ordinarily skilled in the art. The $m_{FUEL}$ may be calculated by determining the total amount of fuel injected into the engine 12 over a given period of time as known by those ordinarily skilled in the art. The exhaust mass flow rate, therefore, may be calculated by adding $m_{FUEL}$ and $m_{AIR}$. The exhaust mass flow rate may be measured in units of grams (g) per second (s), (i.e., g/s).

During engine operation, operating conditions of the SCRF 20 (e.g., SCRF temperature, temperature gradient of the SCRF 20, etc.) may cause the SCRF 20 to store an insufficient amount of reductant (e.g., $NH_3$). For example, $NH_3$ may slip from the SCRF 20 when the SCRF temperature increases. To reduce the possibility of $NH_3$ slip, the reductant storage module 106 generates a setpoint signal 206 indicating a reductant setpoint. The reductant setpoint indicates a target storage level of the SCRF 20 for one or more operating conditions (e.g., a temperature of the SCRF 20). For example, the reductant setpoint may indicate an amount of $NH_3$ typically stored on the SCRF 20 with respect to a particular SCRF temperature. Based on the setpoint, the injector control module 108 outputs an injector control signal 208 to the injector 36 and controls the amount of reductant 35 injected into the exhaust gas 16. Accordingly, the reductant storage level of the SCRF 20 may be adjusted to achieve the setpoint. In addition, the reductant storage module 106 may increase or decrease the storage level to reach a newly determined setpoint. Additionally, the injector control module 108 may increase or decrease the storage level to maintain a setpoint when the setpoint is reached.

The reductant storage module 106 may also utilize the age of the SCRF 20 to further calibrate the reductant storage setpoint. For example, as the age (e.g., the amount of use over time) of the SCRF 20 increases, the ability to maintain storage of the reductant decreases. In an exemplary embodiment, an age factor corresponding to a new SCRF 20 may be initially stored in the memory 102. Over time, the age factor may update based on a temperature realized by the SCRF 20 during a regeneration process. The age factor may be provided to the reductant storage module 106 via an age factor signal 210. Accordingly, the reductant storage module 106 may apply the age factor to the calibrated reductant storage factor to more accurately calibrate the storage setpoint.

The injector control module 108 is in electrical communication with the reductant storage module 106 and the reductant delivery system 32. As mentioned above, the injector control module 108 receives the setpoint signal 206, which indicates a target amount of reductant to be stored on the SCRF 20 at a particular operating condition (e.g., an operating condition of the engine and/or the SCRF 20). Accordingly, the injector control module 108 outputs the injector control signal 208 that controls the injector 36 to inject reductant 35 according to the setpoint.

The WCT module 110 determines a thickness of the washcoat (i.e., an actual WCT) disposed on the SCRF 20. The WCT module 110 may utilize a WCT model 212 stored in the memory 102 to determine the actual WCT. In at least one exemplary embodiment, the WCT model 212 is based on the $\Delta p$ of the SCRF 20. The $\Delta p$ is determined, for example, according to a pressure signal 214 output by the pressure sensor 30. In at least one embodiment, the WCT module 110 may determine the WCT in response to the occurrence of one or more entry conditions 216 including, but not limited to, exhaust temperature, SCRF temperature, and engine operating time. The entry conditions 216 may be received by the entry condition module 104 from one or more sensors, and output to the WCT module 110 and/or the memory 102 accordingly.

The WCT compensation module 112 is in electrical communication with the reductant storage module 106 and the WCT module 110. The WCT compensation module 112 may determine a WCT compensation value that compensates for the washcoat disposed on the SCRF 20. More specifically, the WCT compensation module 112 receives a WCT signal 218 from the WCT module 110 indicating the actual WCT of the SCRF 20, and compares the actual WCT to a nominal WCT value 220 stored in the memory 102. Based on the comparison, the WCT compensation module 112 determines a WCT differential between the actual WCT and the nominal WCT value 220. Based on the WCT differential, the WCT compensation module 112 determines a WCT compensation value, which may be utilized to compensate for the actual WCT disposed on the SCRF 20. In at least one embodiment, the WCT module 112 may set the nominal WCT value as resulting in approximately 100% efficient reductant storage by the SCRF 20. The WCT compensation module 112 may determine the WCT compensation value as a percentage value with respect to the nominal WCT value.

The reductant storage model 106 receives a compensation signal 222 from the WCT module 112 indicating the WCT compensation value, and applies the WCT compensation value to the reductant storage model 200 to adjust the setpoint. The setpoint signal 206 is then output to indicate the adjusted setpoint. The setpoint, therefore, may be adjusted from a first setpoint (e.g., an initial setpoint) to generate a second setpoint (e.g., a new setpoint) different from the first setpoint. The second setpoint reduces the amount of reductant that slips from the SCRF 20 as compared to the first setpoint. In at least one exemplary embodiment, the second setpoint minimizes the amount of reductant that slips from the SCRF 20. The WCT compensation value may be applied in a variety of ways including, but not limited to, adding/subtracting the WCT compensation value to the setpoint, and multiplying the WCT compensation value to the setpoint. Accordingly, the setpoint may be adjusted to compensate for the actual WCT such that the storage efficiency of the SCRF 20 may be improved.

Figure 3:
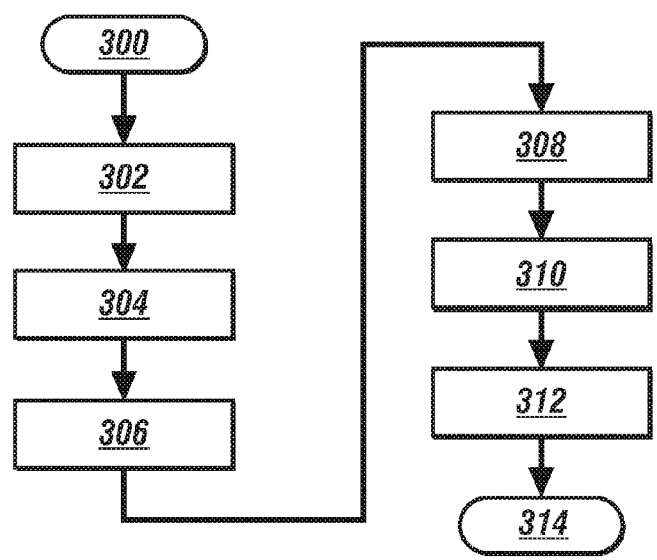
FIG. 3 is a flow diagram illustrating a method of adjusting a setpoint corresponding to a reductant supply model to compensate for a washcoat thickness according to an exemplary embodiment of the disclosure.

Referring now to FIG. 3, a flow diagram illustrates a method of adjusting a setpoint corresponding to a reductant supply model to compensate for a WCT according to an exemplary embodiment of the disclosure. The method begins at operation 300, and at operation 302 a setpoint corresponding to a reductant delivery model that controls an amount of reductant injected from a reductant delivery system is determined. The reductant may include, for example, $NH_3$. At operation 304, a pressure differential ($\Delta p$) corresponding to an SCRF, for example, is determined. The $\Delta p$ may be determined, for example, according to a difference between a pressure existing at the outlet of the SCRF and the pressure existing at the inlet of the SCRF. Various method for determining the pressure differential across the SCRF may be used as understood by those ordinarily skilled in the art. At operation 306, an actual WCT disposed on an SCRF is determined based on the $\Delta p$, for example. At operation 308, the actual WCT is compared to a nominal WCT value to determine a WCT compensation value. At operation 310, the setpoint is adjusted according to the WCT compensation value to generate a new setpoint that minimizes an amount of reductant that slips from the SCRF. At operation 312, the reductant is injected from the reductant delivery system based on the new setpoint, and the method ends at operation 314.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust treatment system, comprising:
    a selective catalyst reduction filter (SCRF) device, the SCRF device including a filter portion having a washcoat disposed thereon defining a washcoat thickness (WCT);
    a reductant delivery system configured to inject a reductant that reacts with the washcoat;
    at least one pressure sensor that determines a pressure differential across the SCRF;
    a reductant storage module including an electronic processor that executes instructions stored in memory, the reductant storage module in electrical communication with the reductant delivery system and configured to determine a reductant setpoint that controls an amount of reductant injected from the reductant delivery system; and
    a WCT compensation module including an electronic processor that executes instructions stored in memory, the WCT compensation module in electrical communication with the reductant storage module, the WCT compensation module configured to determine a WCT compensation value based the WCT and to electrically communicate a WCT compensation value to the reductant storage module to control the amount of reductant injected from the reductant delivery system, wherein the WCT is based on a the pressure differential indicated by a pressure signal output by the at least one pressure sensor.

2. The exhaust treatment system of claim 1, further comprising a WCT module that determines the WCT based on the pressure differential across the SCRF, wherein the reductant storage module adjusts the reductant setpoint according to the WCT compensation value.

3. The exhaust treatment system of claim 2, wherein the WCT compensation module determines the WCT compensation value based on a comparison between the WCT and a nominal WCT value stored in a memory device.

4. The exhaust treatment system of claim 3, wherein the reductant setpoint is based on a reductant storage model stored in the memory device and indicates a target storage level of the SCRF device.

5. The exhaust treatment system of claim 4, wherein the reductant storage model is based on a temperature of the SCRF device and an exhaust mass flow rate of exhaust gas flowing through the exhaust treatment system.

6. The exhaust treatment system of claim 5, wherein reductant storage module further adjusts the reductant setpoint based on an age of the SCRF device.

7. The exhaust treatment system of claim 6, wherein the reductant setpoint is adjusted from a first setpoint to a second setpoint different from the first setpoint, the second setpoint minimizing the amount of reductant that slips from the SCRF device with respect to the first setpoint.

8. A control module including an electronic processor that executes instructions stored in memory, the electronic processor configured to control an injector to inject a reductant that reacts with a washcoat disposed on a SCRF device, the control module comprising:
    a reductant control module including an electronic processor that executes instructions stored in memory, the reductant control module configured to inject reductant according to an initial setpoint that indicates a target storage level of the SCRF device;
    a reduction storage module including an electronic processor that executes instructions stored in a memory device, the reduction storage module configured to determine the initial setpoint based on a reductant storage model stored in the memory device; and
    a washcoat thickness (WCT) compensation module including an electronic processor that executes instructions stored in memory, the WCT compensation module configured to compare a thickness of the washcoat disposed on the SCRF device with a nominal washcoat thickness value stored in the memory device, and to generate a WCT compensation value based on the comparison, the thickness of the washcoat based on a pressure differential indicated by a pressure signal output by at least one pressure sensor,
    wherein the reductant storage module is in electrical communication with the WCT compensation module and adjusts the initial setpoint based on the WCT compensation value to generate a new setpoint different from the initial setpoint.

9. The control module of claim 8, wherein the new setpoint reduces the amount of reductant that slips from the SCRF device with respect to the initial setpoint.

10. The control module of claim 9, further comprising a WCT module including an electronic processor that executes instructions stored in memory, the WCT module in electrical communication with the WCT compensation module and the at least one pressure sensor, the WCT module configured to determine the thickness of the washcoat based on the pressure differential across the SCRF.

11. The control module of claim 10, wherein the reductant storage model is based on a temperature of the SCRF device and an exhaust gas mass flow rate realized by the SCRF device.

12. A method of controlling an exhaust treatment system, the method comprising:
    determining a setpoint corresponding to a reductant delivery model that controls an amount of reductant injected from a reductant delivery system;
    determining a pressure differential across an SCRF device using at least one pressure sensor, and determining the thickness of the washcoat based on the pressure differential;
    determining a thickness of a washcoat disposed on the SCRF device included in the exhaust treatment system, the thickness of the washcoat determined using a washcoat thickness WCT module including an electronic processor that executes instructions stored in memory;
    comparing the thickness of the washcoat to a nominal WCT value stored in an electronic memory device;
    adjusting the setpoint according to the WCT compensation value to generate a new setpoint that minimizes an amount of ammonia that slips from the SCRF device; and
    injecting the reductant from the reductant delivery system based on the new setpoint.

13. The method of claim 12, further comprising determining the reductant storage model based on a temperature of the SCRF device and an exhaust mass flow rate of exhaust gas flowing through the exhaust treatment system.

14. The method of claim 13, further comprising generating the new setpoint based on an age of the SCRF device.

* * * * *